United States Patent
Hsu et al.

(10) Patent No.: US 10,534,492 B2
(45) Date of Patent: Jan. 14, 2020

(54) MUTUAL CAPACITIVE TOUCH PANEL HAVING DOUBLE-LAYER ELECTRODE STRUCTURE

(71) Applicant: ILI TECHNOLOGY CORP., Hsinchu County (TW)

(72) Inventors: Cheng-Hsien Hsu, Hsinchu County (TW); Guo-Kiang Hung, Hsinchu County (TW); Wei-Lun Kuo, Hsinchu County (TW); Yu-Tsung Chen, Hsinchu County (TW)

(73) Assignee: ILI TECHNOLOGY CORP., Hsinchu County (TW)

( * ) Notice: Subject to any disclaimer, the term of this patent is extended or adjusted under 35 U.S.C. 154(b) by 0 days.

(21) Appl. No.: 16/186,600

(22) Filed: Nov. 12, 2018

(65) Prior Publication Data
US 2019/0196620 A1    Jun. 27, 2019

(30) Foreign Application Priority Data
Dec. 21, 2017 (TW) .............................. 106145024 A

(51) Int. Cl.
*G06F 3/044* (2006.01)
(52) U.S. Cl.
CPC .................................... *G06F 3/044* (2013.01)
(58) Field of Classification Search
CPC ...................................................... G06F 3/044
See application file for complete search history.

(56) References Cited

U.S. PATENT DOCUMENTS

| | | | |
|---|---|---|---|
| 2009/0211818 A1* | 8/2009 | Kondo | G06F 3/0414 178/18.03 |
| 2014/0022186 A1* | 1/2014 | Hong | G06F 3/0416 345/173 |
| 2014/0211104 A1* | 7/2014 | Yang | G06F 3/041 349/12 |
| 2015/0287381 A1* | 10/2015 | Kim | G06F 3/044 345/174 |
| 2016/0274697 A1* | 9/2016 | Chan | G06F 3/044 |
| 2018/0088707 A1* | 3/2018 | Na | G02F 1/13338 |

* cited by examiner

*Primary Examiner* — Ariel A Balaoing
(74) *Attorney, Agent, or Firm* — JCIPRNET

(57) ABSTRACT

The present invention provides a mutual capacitive touch panel including a first conductive layer and a second conductive layer. The first conductive layer includes a plurality of electrodes arranged in an array and a plurality of connecting line segments. In each column of the array, the electrodes in the $((N \times M)-1)^{th}$ row are electrically connected to one another through some of the connecting line segments to form a first electrode series, and the electrodes in the $(N \times M)^{th}$ row are electrically connected to one another through some of the connecting line segments to form a second electrode series. The second conductive layer includes a plurality of electrode strips extending along a row direction of the array and respectively overlapping the electrodes located at the corresponding row. Each electrode strip includes a plurality of shielding portions, each of which overlaps one corresponding of the connecting line segments.

16 Claims, 13 Drawing Sheets

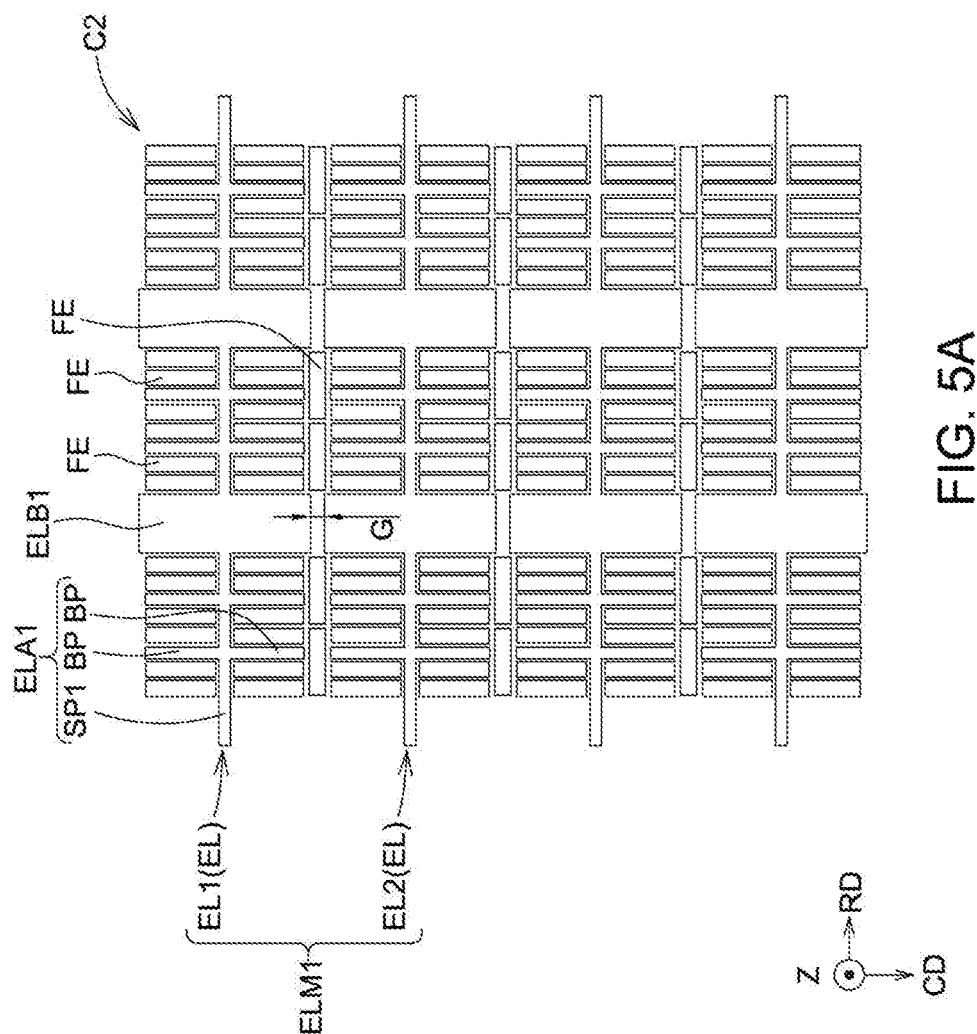

MUTUAL CAPACITIVE TOUCH PANEL HAVING DOUBLE-LAYER ELECTRODE STRUCTURE

This application claims the benefit of Taiwan application Serial No. 106145024, filed Dec. 21, 2017, the subject matter of which is incorporated herein by reference.

BACKGROUND OF THE INVENTION

Field of the Invention

The invention relates to a mutual capacitive touch panel, and more particularly, to a mutual capacitive touch panel having a double-layer electrode structure.

Description of the Related Art

With the constantly innovating technologies, touch display devices, consisting a display device and a touch panel, are capable of simultaneously implementing touch control and display functions to offer human-machine interactivity, and are extensively applied in electronic products such as smart phones, GPS navigation systems, tablet computers and laptop computers. Among current touch panels, mutual capacitive touch panels featuring advantages of high accuracy, multi-touch, good durability and high touch resolution have become the mainstream touch technology currently used in industry.

The mutual capacitive touch control technology determines a touch control event primarily through detecting a coupling capacitance change generated by static electricity on a touching object and touch control units on a touch panel, when the touching object approaches or touches the touch control units. The mutual capacitive touch control technology, in the aspect of structural design, is mainly categorized into two types—single-layer electrode structures and double-layer electrode structures. Because structural designs and control algorithms of a double-layer electrode structure are simpler than those of single-layer electrode structure, the design of a double-layer electrode structure is commonly applied in mid- to high-end consumer electronic products. In a conventional double-layer electrode structure, sensing series and driving series respectively extend along a horizontal direction and a vertical direction that are perpendicular to each other, it is thus necessary that conductive lines connect the sensing series from two sides of the sensing series, such that the ranges of border regions at the two horizontal sides of a touch panel cannot be reduced. Thus, in another conventional solution, driving series of the same column are divided into two driving series, and two adjacent sensing series are electrically connected to each other, so as to reduce the number of conductive lines for connecting sensing series and to further effectively reduce the width of borders of a touch panel.

To divide the driving series of the same column into two driving series, connecting lines are needed to electrically connect odd-row driving electrodes and electrically connect even-row driving electrodes of the same column. Thus, when a touching object moves in a straight line along the Y-axis direction, a situation that the motion trajectory measured by the sensing series is not a straight line may occur. As shown in FIG. 1, when a touching object moves in a straight line along the Y-axis direction, the measured trajectory fluctuates left and right in the X-axis direction; that is, the motion trajectory detected by the touch panel does not match the actual motion trajectory of the touching object, resulting in an issue of inaccurate detection.

SUMMARY OF THE INVENTION

It is an object of the present invention to provide a mutual capacitive touch panel having a double-layer electrode structure so as to enhance detection accuracy, given a small quantity of conductive lines.

To achieve the above object, the present invention discloses a mutual capacitive touch panel including a touch region and a border region. The mutual capacitive touch panel includes a first conductive layer, a second conductive layer and an insulation layer. The first conductive layer includes a plurality of electrodes and a plurality of connecting line segments. The electrodes are arranged in an array, and are located in the touch region. In each column of the array, the electrodes located in the $((N \times M)-1)^{th}$ row are electrically connected to one another to form a first electrode series, and the electrodes located in the $(N \times M)^{th}$ row are electrically connected to one another to form a second electrode series, wherein N is a positive integer greater than or equal to 2 and M is a positive integer greater than or equal to 1. The connecting line segments include a plurality of first connecting line segments and a plurality of second connecting line segments. Each first connecting line segment connects two adjacent electrodes in one corresponding of the first electrode series, and each second connecting line segment connects two adjacent electrodes in one corresponding of the second electrode series. The second conductive layer is provided on the first conductive layer, and includes M electrode strip groups that are insulated from one another and located along a column direction of the array in the touch region. Each electrode strip group includes N electrode strips, which extend along a row direction of the array and overlap, in a perpendicular projection direction, the electrodes of one corresponding row. Each of the electrode strips includes a plurality of strip portions and a plurality of shielding portions, wherein the strip portions and the shielding portions are alternately connected in series along the row direction of the array. Each of the first strips is provided correspondingly to one of the electrodes, and each of the shielding portion overlaps, in the perpendicular projection direction, one corresponding of the connecting line segments. The width of the shielding portions in the column direction of the array is greater than the width of the strip portions in the column direction of the array. The insulation layer is provided between the first conductive layer and the second conductive layer.

The above and other aspects of the invention will become better understood with regard to the following detailed description of the preferred but non-limiting embodiments. The following description is made with reference to the accompanying drawings.

BRIEF DESCRIPTION OF THE DRAWINGS

FIG. 5A is a top schematic diagram of a second conductive layer according to a first embodiment of the present invention;

DETAILED DESCRIPTION OF THE INVENTION

Figure 1:
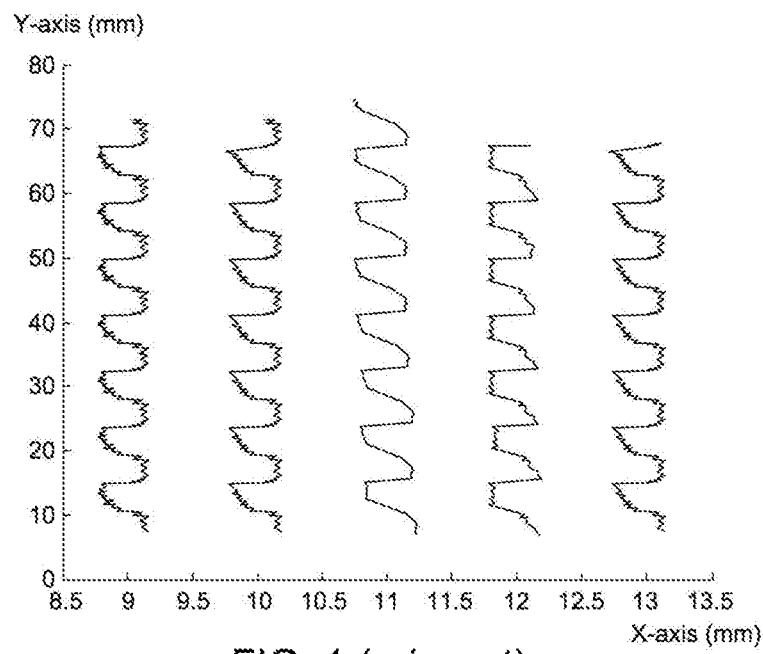
FIG. 1 shows a motion trajectory detected when a touching object moves in a straight line along the Y-axis direction in a conventional touch panel.

For a person skilled in the art to better understand the present invention, compositions of and effects to be achieved by the present invention are given in detail in the non-limiting embodiments with the accompanying drawings below. It should be noted that, the drawings are simplified schematic diagrams, which depict only combination relationships of components associated with the present invention to better describe the fundamental structures of the present invention, and actual components and layouts may be more complex. For illustration purposes, the components in the drawings of the present invention are not drawn to actual quantities, shapes and sizes, and detailed proportions may be adjusted according to actual design requirements.

Figure 2:
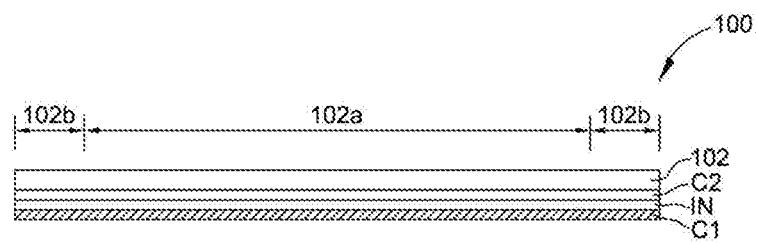
FIG. 2 is a side schematic diagram of a mutual capacitive touch panel of the present invention.

FIG. 2 shows a side schematic diagram of a mutual capacitive touch panel of the present invention. As shown in FIG. 2, the mutual capacitive touch panel 100 has a touch region 102a and a border region 102b. The touch region 102a is for placing driving electrodes and sensing electrodes, and the border region 102b is for placing connecting conductive lines. In this embodiment, the border region 102b may be, for example but not limited to, around the touch region 102a. The mutual capacitive touch panel 100 includes a first conductive layer C1, a second conductive layer C2 and an insulation layer IN. The insulation layer IN is provided between the first conductive layer C1 and the second conductive layer C2. The first conductive layer C1 and the second conductive layer C2 may be electrically insulated from each other through the insulation layer IN provided in between, and the second conductive layer C2 is closer to a touching object for inputting an instruction compared to the first conductive layer C1. For example, the touching object may be a finger or a stylus. In this embodiment, the mutual capacitive touch panel 100 may further include a substrate 102. The second conductive layer C2, the insulation layer IN and the first conductive layer C1 are sequentially formed on the same side of the substrate 102, and the second side opposite to the first side of the substrate 102 is the one side close to the touching object. The mutual capacitive touch panel of the present invention is, for example, a stacked structure. In another embodiment, the first conductive layer C1 and the second conductive layer C2 may be respectively formed on thin films, and the thin film provided with the second conductive layer C2 and the thin film provided with the first conductive layer C1 are adhered to the substrate 102 through two adhesive layers, so as to form the mutual capacitive touch panel 100. In this embodiment, the thin film between the first conductive layer C1 and the second conductive layer C2 may serve as the insulation layer IN. In another embodiment, the first conductive layer C1, the insulation layer IN and the second conductive layer C2 may also be sequentially formed on a display surface of the display panel, e.g., on a color filter substrate of an LCD panel or a packaging cover lens of an organic light-emitting diode (OLED) display panel, and the first conductive layer C1 is covered by the substrate 102. Further, the substrate 102 may include a hard substrate or a flexible substrate, e.g., a glass substrate, a reinforced glass substrate, a quartz substrate, a sapphire substrate, a hard cover lens, a plastic substrate, a flexible cover lens, a flexible plastic base or a thin glass substrate.

Figure 3:
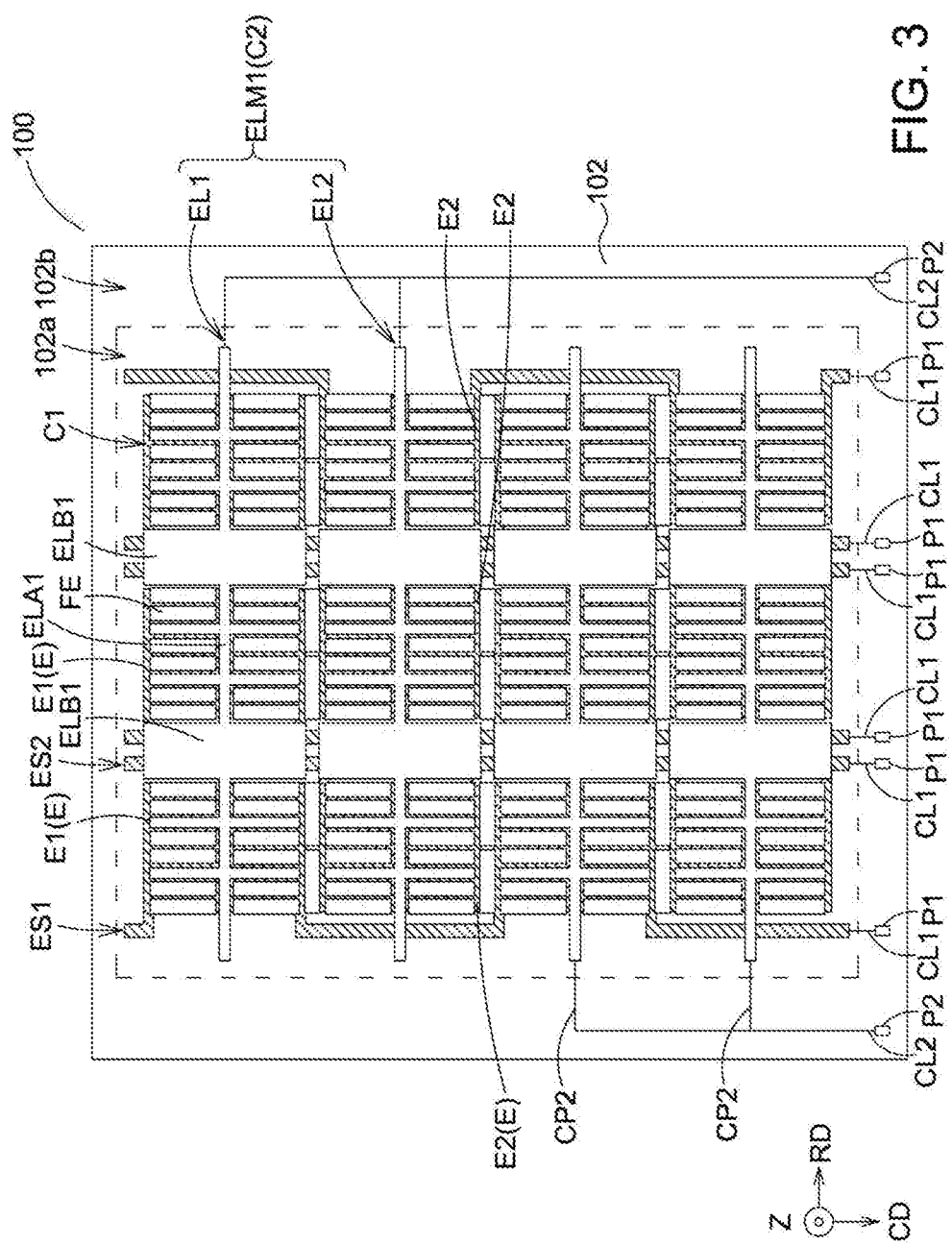
FIG. 3 is a top schematic diagram of a mutual capacitive touch panel according to a first embodiment of the present invention.
Figure 4:
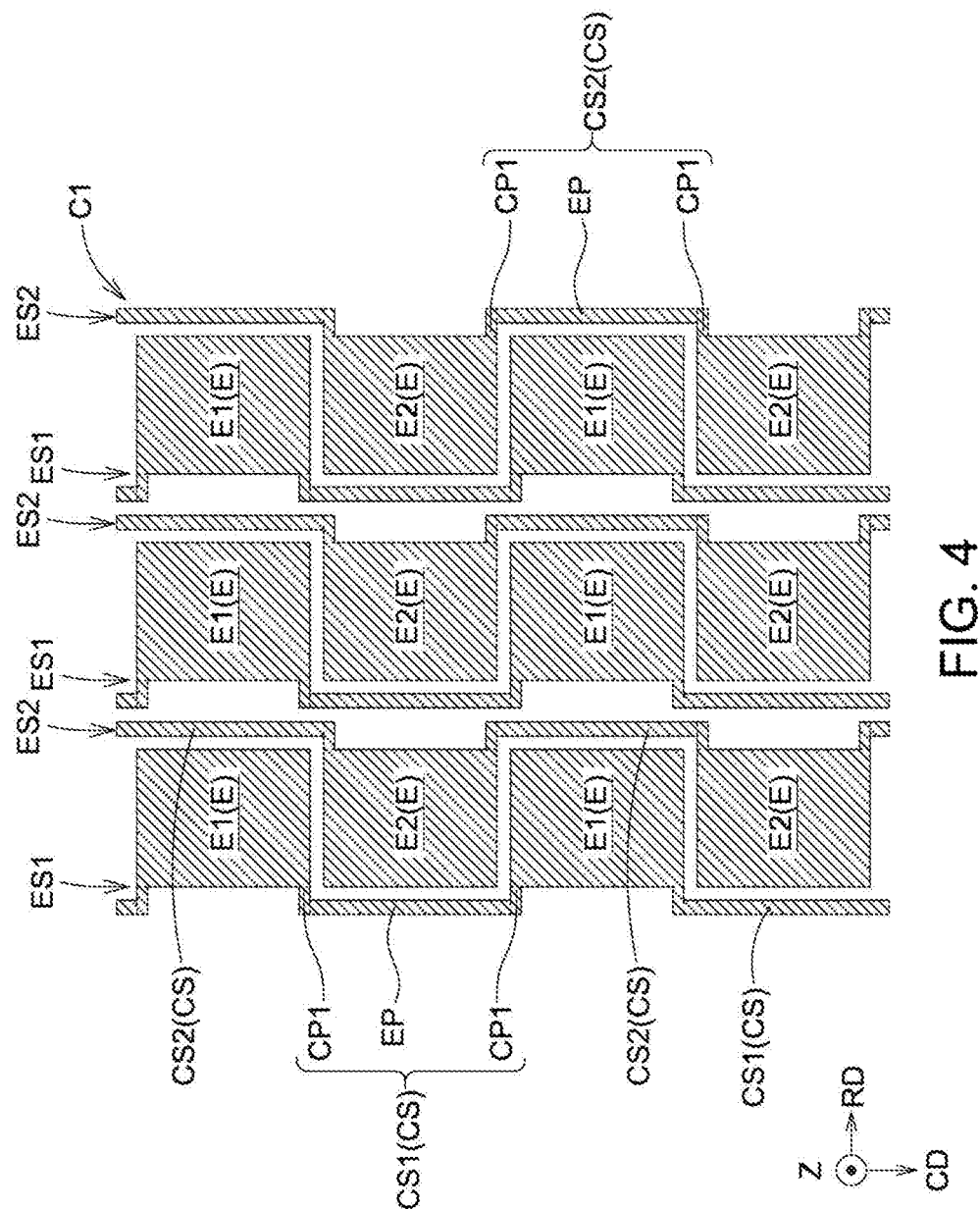
FIG. 4 is a top schematic diagram of a first conductive layer according to a first embodiment of the present invention.

Refer to FIG. 3 to FIG. 5A. FIG. 3 shows a top schematic diagram of a mutual capacitive touch panel according to a first embodiment of the present invention. FIG. 4 shows a top schematic diagram of a first conductive layer according to the first embodiment of the present invention. FIG. 5A shows a top schematic diagram of a second conductive layer according to the first embodiment of the present invention. As shown in FIGS. 3 and 4, the first conductive layer C1 includes multiple electrodes E arranged in an array and located in the touch region 102a. Each column of the array at least includes a first electrode series ES formed by electrically connecting electrodes E located in the $((N \times M)-1)^{th}$ row, and a second electrode series ES formed by electrically connecting electrodes E located in the $(N \times M)^{th}$ rows, where N is a positive integer greater than or equal to 2 and M is a positive integer greater than or equal to 1. More specifically, the electrodes E at least include M first electrodes E1 and M second electrodes E2. The first electrodes E1 are located in the $((N \times M)-1)^{th}$ row, the second electrodes E2 are located in the $(N \times M)^{th}$ row, the first electrodes E1 of the same column are electrically connected to one another to form one first electrode series ES1, and the second electrodes E2 of the same column are electrically connected to one another to form one second electrode series ES2. That is to say, when it is defined that the first electrodes E1 electrically connected to one another are one type of electrodes E and the second electrodes E2 electrically connected to one another are another type of electrodes E, the arrangement of the electrodes E of the same column may be comprehended as: N number of electrodes E of different types are considered as one group, and are arranged sequentially and repeatedly for M number of times. In this embodiment, N is equal to 2. Thus, the first electrodes E1 are located in odd rows (i.e., 2M-1 row(s)), and the second electrodes E2 are located in even rows (i.e., 2M row(s)). That is to say, in each column of the array, the first electrodes E1 and the second electrodes E2 are sequentially and alternatingly arranged along a column direction CD of the array. In another embodiment shown in FIG. 15, N is equal to 3. Thus, the first electrodes E1 are located in the 3M-1 row(s), the second electrodes E2 are located in the 3M row(s), and third electrodes E3 are included and located in the 3M-2 row(s). Associated details are to be given shortly. In an embodiment where N is equal to 2, to electrically connect the first electrodes E1 of the same column and to electrically connect the second electrodes E2 of the same column, the first conductive layer C1 further includes a plurality of connecting line segments CS, which include a first connecting line segment CS1 and a plurality of connecting line segments CS2. Each connecting line segment CS1 connects two adjacent of the first electrodes E1 in the corresponding first electrode series ES1 (i.e., two adjacent first electrodes E1 located in the same column but in different odd rows) to form the first electrode series ES1. Each second connecting line segment CS2 connects two adjacent of the second electrodes ES2 in the corresponding second electrode series ES2 (i.e., two adjacent second electrodes E2 located in the same column but different odd rows) to form the second electrode series ES2. In this embodiment, the first connecting line segment CS1 and the second connecting line segment CS2 corresponding to the first electrodes E1 and the second electrodes E2 are respectively provided on two sides of the first electrodes E1 and the second electrodes E2 of the same column, e.g., left and right sides, or vice versa. Thus, the first connecting line segments CS1 and the second connecting line segments CS2 can be separated, so as to form the first connecting line segments CS1 electrically connected to the first electrodes E1 of the same column and the second connecting line segments CS2 electrically connecting the second electrodes E2 of the same column in the same first conductive layer C1, and to allow the first electrode series ES1 and the second electrode series ES2 formed by the first conductive layer C1 to be electrically insulated from each other. Each of the connecting line segments CS may be further divided into an extension portion EP extending along the column direction CD of the array and two first connecting portions CP that are non-parallel to the extension portion EP, wherein each of the first connecting portion CP extends to the corresponding electrode E. In this embodiment, the first electrodes E1 and the second electrodes E2 of each column overlap one another in the column direction CD of the array and are aligned. Further, the first connecting line segments CS1 do not overlap, in the column direction CD of the array, the first electrodes E1 of the corresponding first electrode series ES1, and the second connecting line segments CS2 do not overlap, in the column direction CD of the array, the second electrodes E2 of the corresponding second electrode series ES2. Further, any two adjacent of the electrodes E located in the same row but different columns are mutually separated and insulated, such that the first electrode series ES1 of different columns are mutually insulated and the second electrode series ES2 of different columns are mutually insulated.

As shown in FIGS. 3 and 5A, the second conductive layer C2 includes a plurality of electrode strip groups ELM1, which are insulated from one another and are sequentially arranged along the column direction CD of the array in the touch region 102a. Each of the electrode groups ELM1 includes N electrode strips EL arranged along the row direction RD of the array, and overlap, in a perpendicular projection direction Z, the electrodes of the corresponding row. Further, each of the electrode strips EL includes a plurality of electrode portions ELA1 and a plurality of shielding portions ELB1, and the electrode portions ELA1 and the shielding portions ELB1 are sequentially and alternatingly connected in series along the row direction RD of the array. More specifically, in each of the electrode strips EL, each of the electrode portions ELA1 is provided correspondingly to one electrode E, i.e., each electrode portion ELA1 overlaps, in the perpendicular projection direction Z, one corresponding of the electrodes E, and each of the shielding portions ELB1 overlaps, in the perpendicular projection direction Z, one corresponding of the connecting lines segments CS located at the first conductive layer C1. In this embodiment, each electrode portion ELA1 is for coupling with the corresponding electrode E to form a touch unit for detecting a position of the touching object. Each shielding portion ELB1 shields the signal on the connecting line segment CS from the influence of the coupling capacitance generated by each electrode portion ELA1 and the corresponding electrode E1. Further, each electrode portion ELA1 may include a first strip portion SP1, which connects two adjacent shielding portions ELB1 in the same electrode strip EL. Further, the width of the shielding portions ELB1 in the column direction CD of the array is greater than the width of the strips portion SP1 in the column direction CD of the array, such that the shielding portions ELB1 effectively shield the connecting line segments CS located at the first conductive layer C1. Further, each shielding portion ELB1 can cover at least a part of the extension portion EP of the corresponding connecting line segment CS. For example, the width of the shielding portions ELB1 in the column direction CD of the array is greater than by 10% or equal to the width of the electrodes E in the column direction CD of the array. Preferably, the width of the shielding portions ELB1 in the column direction CD of the array is greater than by 50% or equal to the width of the electrodes E in the column direction CD of the array. Further, two adjacent shielding portions ELB1 between the electrodes E located at two adjacent columns are separated by a gap G in between. In the above situation, two adjacent shielding portions ELB1 located between the electrodes E of two adjacent columns are arranged as closely as possible to effectively shield the corresponding line segments CS. For example, in regard to a yellow-light process, the minimum distance limit for separating two adjacent shielding portions ELB1 is about 0.05 mm, and so the gap G between two adjacent shielding portions ELB1 of the electrodes E of two adjacent columns may be, for example but not limited to, greater than or equal to 0.05 mm. In regard to a screen printing process, the minimum distance limit for separating two adjacent shielding portions ELB1 is about 0.3 mm, and so the gap G between two adjacent shielding portions ELB1 of the electrodes E of two adjacent columns may be, for example but not limited to, greater than or equal to 0.3 mm. It is known that, in response to conditions of different processes or evolvement of processes, the gap G between two adjacent shielding portions ELB1 may be reduced or may be different. It should be noted that, no floating electrode is provided between two adjacent shielding portions ELB1 between the electrodes E of two adjacent columns, so as to prevent the connecting line segments CS from affecting the sensing of the electrode strips EL through the floating electrode. In this embodiment, for example but not limited to, the first electrode series ES1 and the second electrode series ES2 are driving electrodes for transmitting driving signals, and the electrode strips ELM1 are sensing electrodes for generating sensing signals according to the corresponding driving signals. In another embodiment, the first electrode series ES1 and the second electrode series ES2 may be sensing electrodes, and the electrode groups ELM1 are driving electrodes.

Further, each of the electrode portions ELA1 in this embodiment may further include a plurality of branch portions BP protruding from two sides of each first strip portion SP1, in a way that the first strip portion SP1 and the branch portions BP of each electrode portion ELA1 form a grating electrode, thus increasing the capacitance change of each touch unit when touched and not touched by a touching object. The shapes of the electrode portions are not limited to the above example, and may be in other shapes.

In this embodiment, N is equal to 2, and each electrode strip group ELM1 may include two electrode strips EL, i.e., the first electrode strip EL1 and the second electrode strip EL2, and the first electrode strip EL1 and the second electrode strip EL2 of each electrode strip group ELM1 are electrically connected to each other (the connecting part is depicted in FIG. 3 and is to be described below). The first electrode strip EL1 and the second electrode strip EL2 of the same electrode strip group ELM1 are adjacent, and may thus overlap the first electrode E1 and the second electrode E2 of two adjacent rows, respectively, i.e., forming capacitance coupling with the first electrode series ES1 and the second electrode series ES2, so as to have the same electrode strip group ELM1, together with the first electrode series ES1 and the second electrode series ES2 of the same column, form two different touch units. In this embodiment, the width of the electrodes E in the column direction CD of the array may be greater than the width of the first strip portions SP1 of the electrode strips EL1 in the column direction CD of the array. Thus, the electrodes E are capable of effectively shielding and blocking the influence of the display device on the electrode strips EL, thereby enhancing the touch accuracy of the mutual capacitive touch panel 100. Further, because each first electrode strip EL1 crosses the first electrodes E1, each shielding portion ELB1 of each first electrode strips EL1 overlaps a second connecting line segment CS2 passing between the first electrodes E1. Similarly, because each second electrode strip EL2 crosses the second electrodes E2 of the corresponding row, each shielding portion ELB1 of each second electrode strip EL2 overlaps a first connecting line segment CS1 passing between the second electrodes E2. In this embodiment, the width of the shielding portions ELB1 in the column direction CD may be close to the width of the electrodes E1, and thus one of the shielding portions ELB1 of one of the first electrode strips EL1 overlaps both of two adjacent first connecting lines CS1 connected to one of the first electrodes E1, and one of the shielding portions ELB1 of one of the second electrode strips EL2 overlaps both of two adjacent second connecting line segments CS2 of one of the second electrodes E2. More specifically, each shielding portion ELB1 of each first electrode strip may cover the first connecting portion CP1 of two first connecting line segments CS1 adjacent to the corresponding second line segments CS2, and each shielding portion ELB1 of each second electrode strip E2 may cover the first connecting portion CP1 of two second connecting lines CS2 adjacent to the corresponding first connecting line segment CS1, thereby enhancing the effect of shielding the connecting line segments CS. In another embodiment, two sides of each shielding portion ELB1 in the row direction RD may extend to right above the electrodes E on the two sides, such that each shielding portion ELB1 partially overlaps the electrodes E on the two sides.

Figure 5B:
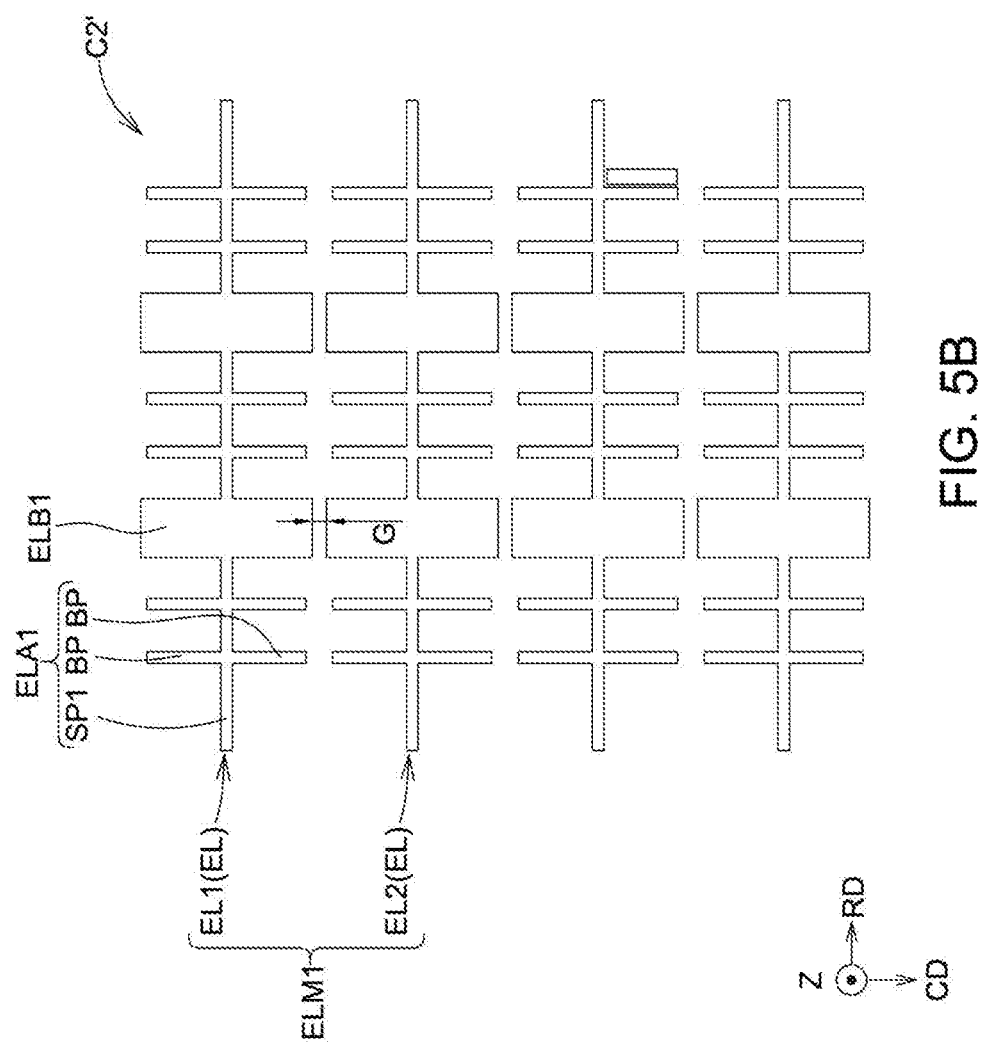
FIG. 5B is a top schematic diagram of a second conductive layer in a first variation according to the first embodiment of the present invention.

The second conductive layer C2 may selectively further include a plurality of floating electrodes FE, which are separated from one another and are separated from the electrode strips EL. Thus, the floating electrodes FE are neither electrically connected to the electrode strips EL nor electrically connected to other signal terminals, yielding the floating electrodes FE to be in a floating state. In this embodiment, the floating electrodes FE may be provided between two adjacent branch portions BP or between the branch portions BP and the shielding portion ELB1. With the floating electrodes FE provided, spaces between the electrodes EL are filled as much as possible in a way that the pattern of the electrode strips EL is not easily visually recognized by the human eye, further reducing the visibility of the mutual capacitive touch panel 100. It should be noted that, the floating electrodes FE need to be provided right above the electrodes E of each column, respectively, such that the floating electrodes FE do not overlap, in the perpendicular projection direction Z, the connecting line segments CS and do not generate capacitance coupling with the line segments CS. More specifically, for the electrodes E located in the same column, the electrodes E have two opposite sides in the row direction RD, and the floating electrodes FE corresponding to the electrodes E of this column need to be provided between the two opposite sides. In another embodiment, as shown in FIG. 5B, a second conductive layer C2 may not include floating electrodes but includes only the electrode strip groups ELM1.

Details of the connection between the electrode strips EL of each electrode strip group ELM1 are given below. In this embodiment, the mutual capacitive touch panel 100 may further include a plurality of first conductive lines CL1 and a plurality of second conductive lines CL2 provided on the substrate 102 in the border region 102b. The first conductive lines CL1 are electrically connected to the first electrode series ES1 and the second electrode series ES2, respectively, and the second conductive lines CL2 are electrically connected to the electrode strips EL of the electrode strip groups ELM1, respectively. More specifically, the first conductive lines CL1 and the second conductive lines CL2 may be made of silver or a transparent conductive material. The first conductive lines CL1 may extend from the border region 102b to the touch region 102a to connect to the corresponding first connecting segments CS1 or second connecting segments CS2. The first conductive lines CL1 and the electrodes E may be formed by the same first conductive layer C1 or be formed by different conductive layers. Each of the second conductive lines CL2 may include two connecting portions CP2, which are respectively connected to the electrode strips EL of the same electrode strip group ELM1. The second conductive lines CL2 and the electrode strips EL may be formed by the same second conductive layer C2 or be formed by different conductive layers. The mutual capacitive touch panel 100 may further include a plurality of first pads P1 and a plurality of second pads P2 disposed on the substrate 102 in the border region 102b on the same side of the touch region 102a. The first pads P1 are electrically connected to the first conductive lines CL1, respectively, and the second pads P2 are electrically connected to the second conductive lines CL2, respectively.

Figure 15:
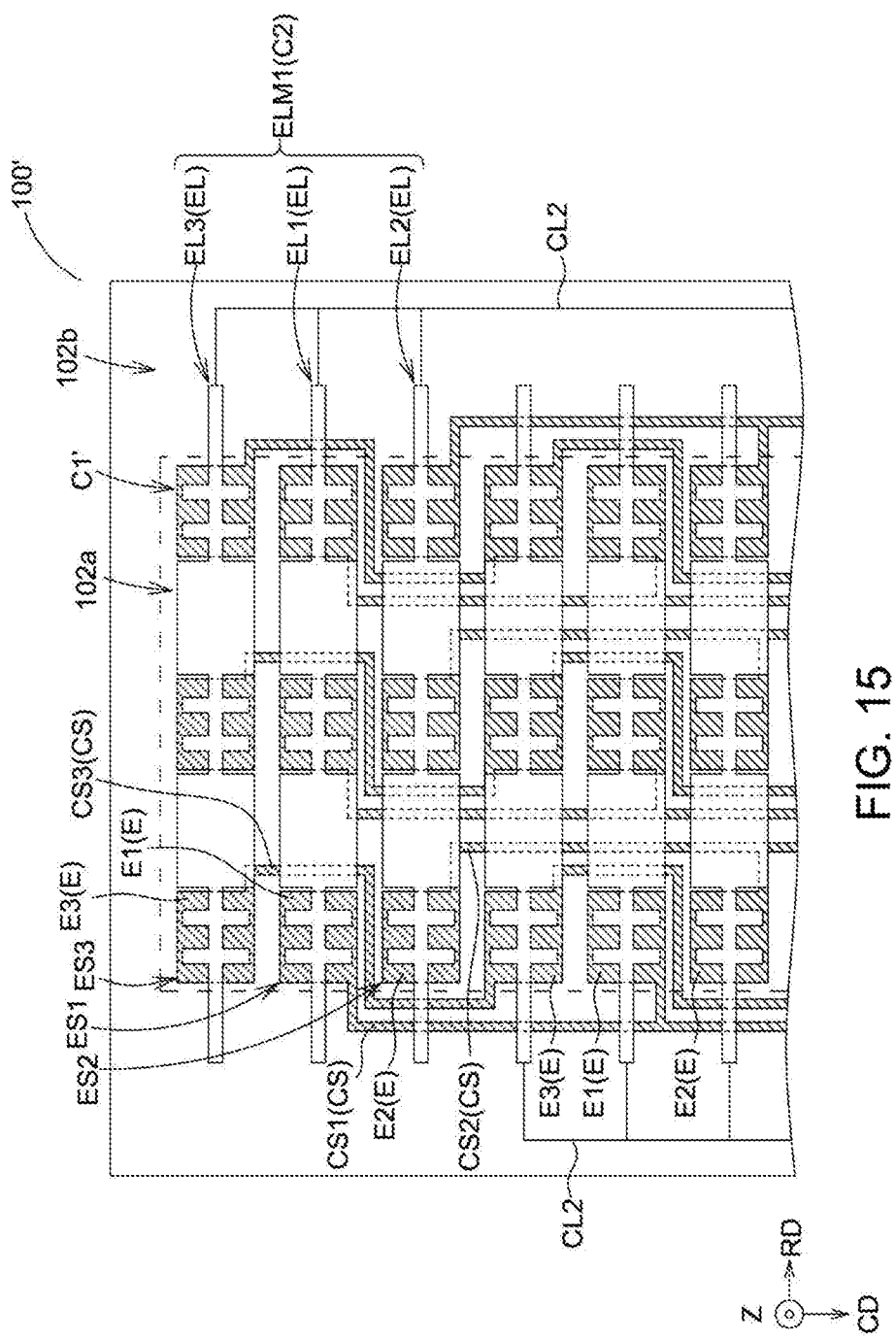
FIG. 15 is a top schematic diagram of a mutual capacitive touch panel in another variation according to the first embodiment of the present invention.

In another embodiment as shown in FIG. 15, when N is equal to 3, each column of the array, in addition to including the first electrode series ES1 and the second electrode series ES2, further includes a third electrode series ES3. In a first conductive layer C1' of this variation embodiment, the electrodes E at least include M first electrodes E1, M second electrodes E2 and M third electrodes E3. The first electrodes E1 located in the $(3M-1)^{th}$ row are electrically connected to one another to form a first electrode series ES1, the second electrodes E2 located in the $3M^{th}$ row are electrically connected to one another to form a second electrode series ES2, and the third electrodes E2 located in the $(3M-2)^{th}$ row are electrically connected to one another to form a third electrode series ES3, wherein the first electrode series ES1, the second electrode series ES2 and the third electrode series ES3 are insulated from one another. Further, in addition to the first connecting line segments CS1 and the second connecting line segments CS2, the connecting line segments CS may further include a plurality of third connecting line segments CS3, each of which connects between two adjacent third electrodes E3 located in the same column and $(3M-2)^{th}$ row. Correspondingly, each electrode strip group ELM1' may include three electrically connected electrode strips EL, which are a first electrode strip EL1, a second electrode strip EL2 and a third electrode strip E3, and the electrode strips EL corresponding to the electrodes E of the same row may generate, together with each of the electrodes E2, capacitance coupling and form touch units. Each second conductive line CL2 is electrically connected to the first electrode strip EL1, the second electrode strip EL2 and the third electrode strip EL3 of each electrode strip group ELM1'. Accordingly, given the same number of touch units, the number of second conductive lines CL2 for electrically connecting the electrode strips EL in this variation embodiment may be less than the number of second conductive lines CL2 for electrically connecting the electrode strips EL in first embodiment, thus more effectively reducing the width of the border region 102b for providing the second conductive lines CL2 in a mutual capacitive touch panel 100'. Similarly, the value N in the present invention may also be a positive integer greater than or equal to 4 to reduce the width of the border region.

Figure 6:
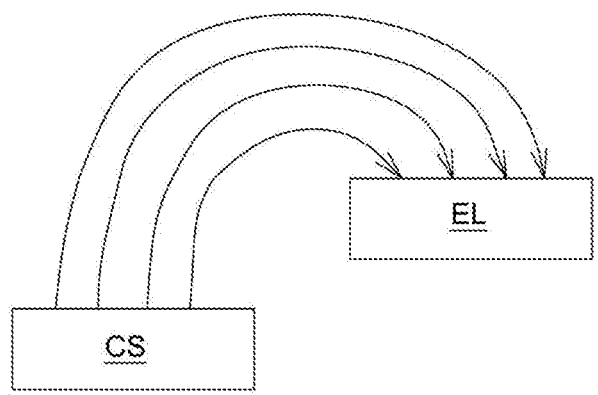
FIG. 6 is a schematic diagram of electric power lines of a corresponding electrode when a connecting line segment is not shielded by a shielding portion.
Figure 7:
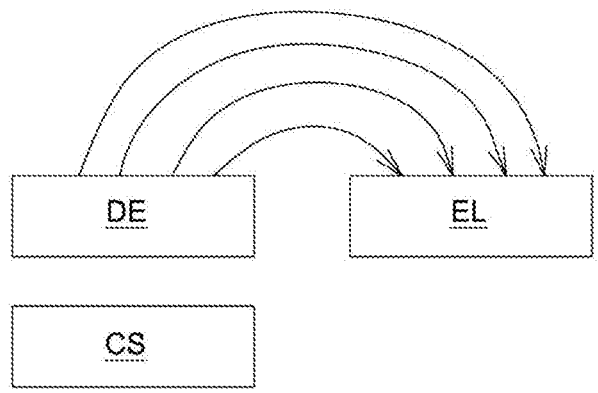
FIG. 7 is a schematic diagram of electric power lines of corresponding electrodes when a dummy electrode is provided above a connecting line segment.
Figure 8:
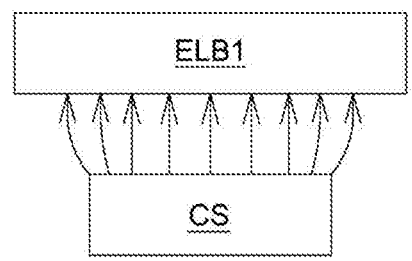
FIG. 8 is a schematic diagram of electric power lines of a corresponding electrode when a connecting line segment is shielded by a shielding portion.

Effects of shielding the connecting line segments by the shielding portions are specifically given in detail below. FIG. 6 shows a schematic diagram of electric power lines of a corresponding electrode strip when a connecting line segment is not shielded by a shielding portion. FIG. 7 shows a schematic diagram of electric power lines of a corresponding electrode strip when a dummy electrode is provided above a connecting line segment. FIG. 8 shows a schematic diagram of electric power lines of a corresponding electrode strip when a connecting line segment is shielded by a shielding portion of the present invention. Referring to FIGS. 6 to 8, as shown in FIG. 6, when no shielding portion is provided right above the connecting line segment CS, a voltage signal transmitted to the connecting line segment CS generates electric power lines that extend to an upper surface of the electrode strip EL. As such, when a touching object is placed on the electrode strip EL, the electric power lines located on the electrode strip EL are noticeably affected by the touching object to cause a change, and the mutual capacitive touch panel detects the coupling capacitance change of the connecting line segment CS and the electrode strip EL, resulting in inaccurate detection. As shown in FIG. 7, when a dummy electrode DE is provided right above the connecting line segment CS, because the dummy electrodes DE is neither electrically connected to the electrode strip EL nor electrically connected to other signal terminals and is in a floating state, the dummy electrode DE is at an equal potential level as the connecting line segment CS due to capacitance coupling when a voltage signal is transmitted on the connecting line segment CS. That is to say, the dummy electrode DE has the same voltage as the connecting line segment CS. Hence, the dummy electrode DE also generates electric power lines that extend to the upper surface of the electrode strip EL, and the mutual capacitive touch panel also detects the coupling capacitance change of the connecting line segment CS with the electrode strip EL through the dummy electrode DE, causing inaccurate detection. As shown in FIG. 8, since the shielding portion ELB1 (a part of the power electrode EL) of the present invention shields the connecting line segment CS, the electric power lines generated by the voltage signal on the connecting line segment CS extend to only a lower surface of the electrode strip EL but not to the upper surface of the electrode strip EL, and so the electric power lines are not affected when a touching object is on the electrode strip EL; that is, the voltage signal on the connecting line segment CS does not affect the detection for the touching object, thus enhancing touch accuracy.

Figure 9:
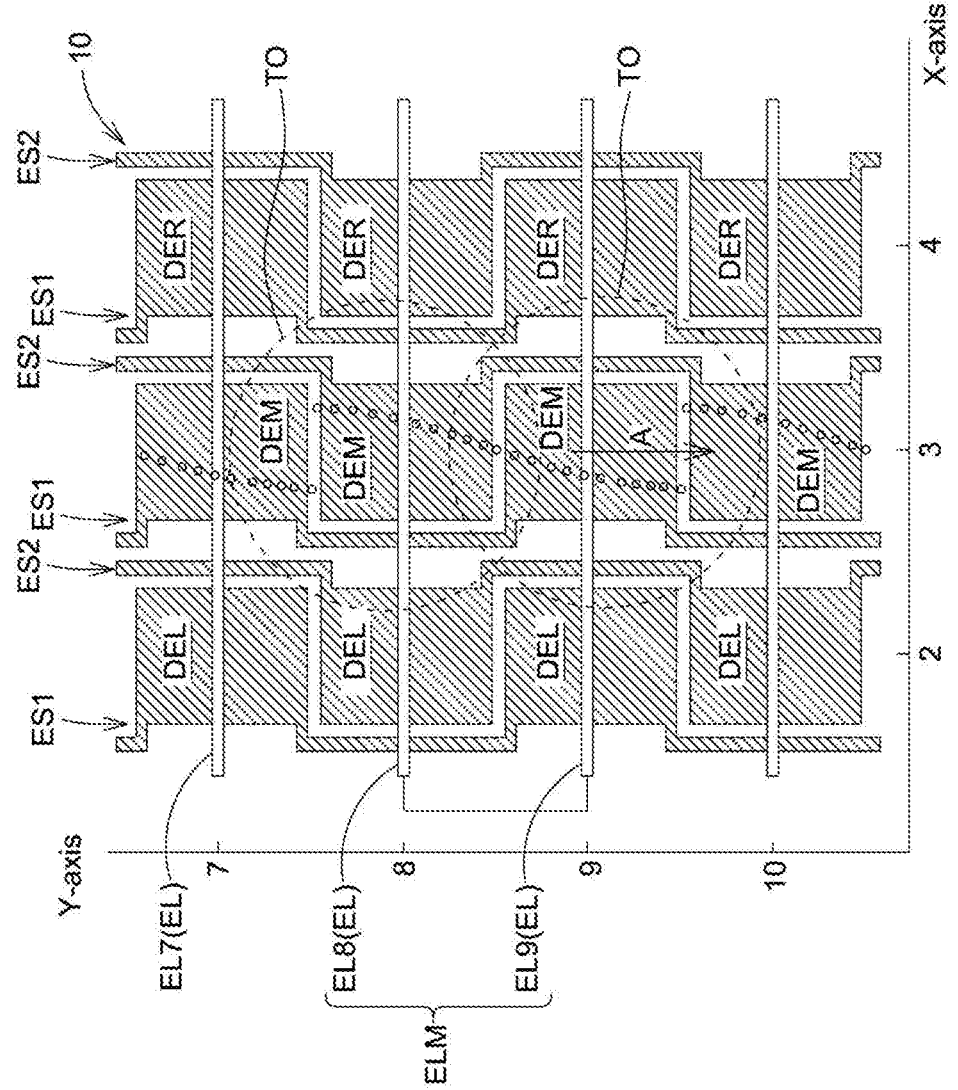
FIG. 9 is a top view and a schematic diagram of corresponding coordinate positions of a mutual capacitive touch panel without shielding portions in a comparison example.
Figure 10:
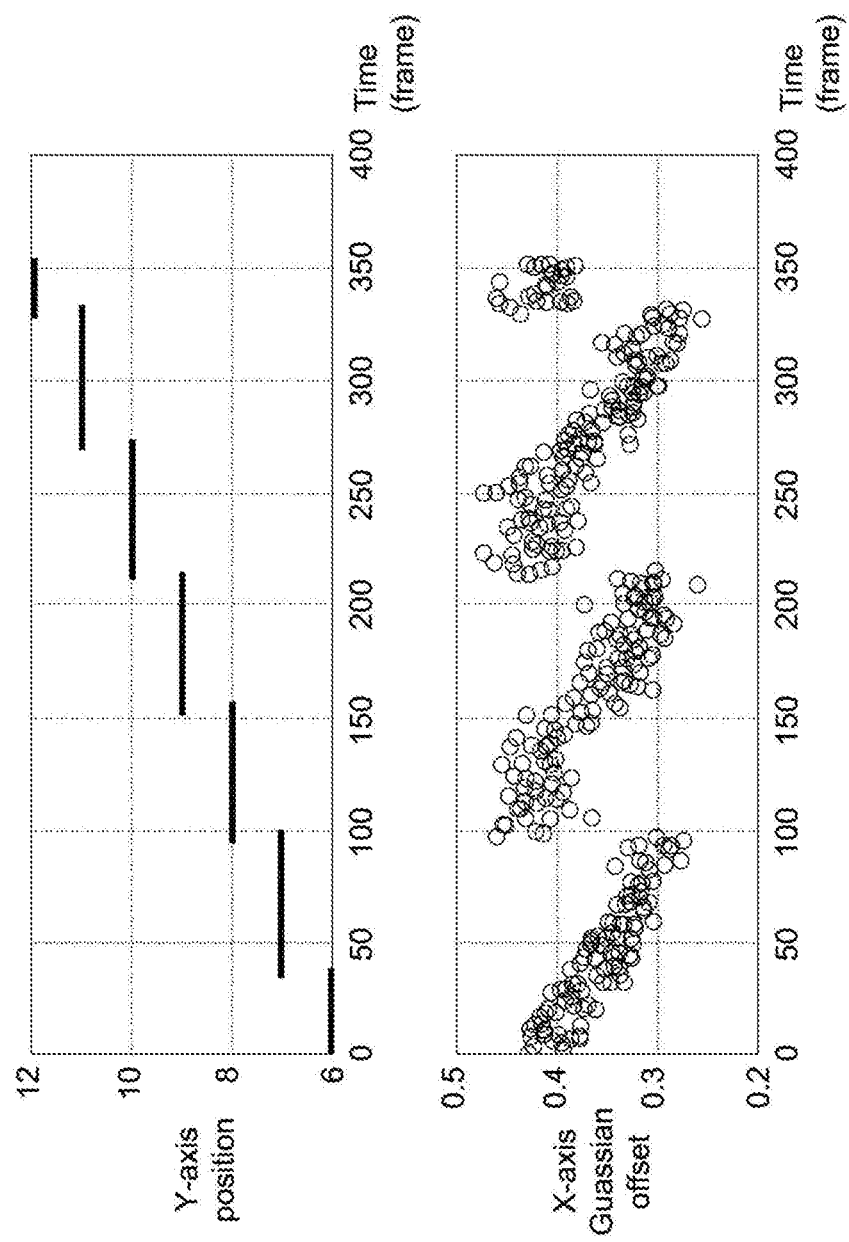
FIG. 10 is a schematic diagram of an X-axis position offset and a Y-axis position corresponding time when a mutual capacitive touch panel detects that a touching object moves in a straight line along the Y-axis direction according to a comparison example.

A mutual capacitive touch panel with a shielding portion and that without a shielding portion are compared for differences therebetween. Refer to FIG. 9 and FIG. 10. FIG. 9 shows a top schematic diagram of a mutual capacitive touch panel without a shielding portion in a comparison example and a corresponding schematic diagram of coordinate positions. FIG. 10 shows a schematic diagram of an X-axis position offset and a time corresponding to a Y-axis position when a touching object moves in a straight line along the Y-axis. As shown in FIGS. 9 and 10, when a touching object TO moves in a straight line along the Y-axis (e.g., the arrow A in FIG. 9), the motion detected from the electrode strip EL is not a straight line, as shown by a measuring point P in FIG. 9. Because the area of the touching object TO is greater than the area of one single electrode, the X-axis position detected is calculated on the basis of sensing amounts DEL, DEM and DER respectively corresponding to the electrode strip EL. That is to say, the sensing amount measured by the electrode strip EL from the electrode DEL is calculated according to the corresponding X-axis coordinate 2, and the sensing amounts measured by the electrode strip EL from the electrode DEM and the electrode DER according to the corresponding X-axis coordinates 3 and 4. An electrode strip EL8 located at the Y-axis coordinate 8 and an electrode strip EL9 located at the Y-axis coordinate 9 are located on the same electrode strip group ELM and are electrically connected to each other. Taking an example where the touching object TO is at the position between the X-axis coordinates 3 and 4 and moves in a straight line along the Y-axis direction for instance, when the electrode strip EL7 detects a maximum Gaussian sensing amount, it is determined that the Y-axis position of the center of the touching object TO is still at 7; when the electrode strip EL8 detects a maximum Gaussian sensing amount, it is determined that the Y-axis position of the center of the touching object TO is at 8. Thus, during the process that the Y-axis coordinate of the center of the touching object TO moves in a straight line from 7 to 8, when the center of the touching object TO is approximately right in the middle of the Y-axis coordinates 7 and 8, the sensing amount measured by the electrode strip EL7 from the electrode DER is 109, whereas the sensing amount measured by the electrode strip EL8 from the electrode DER is 131. Thus, the Gaussian offsets of the calculated X-axis position distanced from the X-axis coordinate 3 are 0.2744 and 0.4578, respectively. That is to say, when the touching object TO is close to the position of the same point, the X-axis position detected by the mutual capacitive touch panel 10 of the comparison example contains a considerable difference, such that the Gaussian offset suddenly changes, further resulting in inaccurate detection. Similarly, the sudden change in the Gaussian offset also exists during the process that the Y-axis coordinate of the center of the touching object TO moves in a straight line from 9 to 10. That is to say, when the touching object TO crosses different electrode strip groups ELM, the X-axis position fluctuates left and right due to the influence received from the connecting line segment CS.

Figure 11:
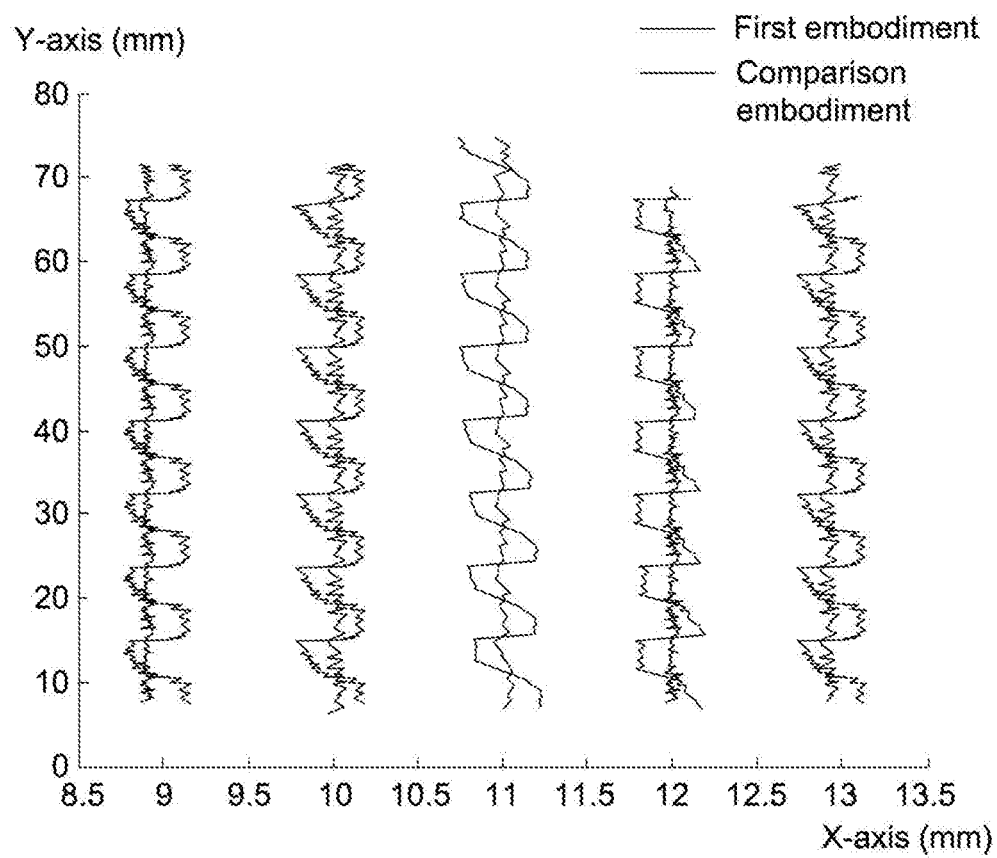
FIG. 11 is a schematic diagram of lines of trajectories measured by a mutual capacitive touch panel according to the first embodiment of the present invention and a mutual capacitive touch panel of a comparison example when a touching object draws lines along different columns of the array.

Referring to FIG. 11 and Table-1, FIG. 11 shows a schematic diagram of lines of trajectories measured by a mutual capacitive touch panel according to the first embodiment of the present invention and a mutual capacitive touch panel of a comparison example when a touching object draws lines along different columns of the array. As shown in FIG. 11 and Table-1, curves of the first embodiment and the comparison example from the left to the right respectively corresponding to the electrodes located at the $1^{st}$ to the $5^{th}$ columns. Assuming that the gap (i.e., a pitch of the electrodes in the X-axis direction) between the centers of two adjacent electrodes of the same row is approximately 4.5 mm, the error in the X-axis position detected by the mutual capacitive touch panel 10 of the comparison example is on an average about 0.4969 mm, and the percentage of the error in the X-axis position detection is about 11.04% of the pitch of the electrodes in the X-axis direction; in contrast, the error in the X-axis position detected by the mutual capacitive touch panel 100 according to this embodiment of the present invention is on an average about 0.19712 mm, and the percentage of the error in the X-axis position detection is about 4.379% of the pitch of the electrodes in the X-axis direction. It is known from the above that, compared to the comparison example, in contribution of the shielding portion provided in the mutual capacitive touch panel 100 according to this embodiment, the detected trajectory better matches the straight line along which the touching object moves, which is equivalently effectively reducing the error in the X-axis position and enhancing the detection accuracy for the X-axis position.

TABLE 1

|  | $1^{st}$ column | $2^{nd}$ column | $3^{rd}$ column | $4^{th}$ column | $5^{th}$ column |
| --- | --- | --- | --- | --- | --- |
| Error in X-axis position of mutual capacitive touch panel in comparison example (mm) | 0.5071 | 0.4951 | 0.4915 | 0.5158 | 0.4751 |
| Percentage in pitch of electrodes in X-axis direction occupied by error in X-axis position of mutual capacitive touch panel in comparison example (%) | 11.27 | 11 | 10.9 | 11.5 | 10.6 |
| Error in X-axis position of mutual capacitive touch panel according to first embodiment (mm) | 0.1758 | 0.2371 | 0.2111 | 0.1810 | 0.1806 |
| Percentage in pitch of electrodes in X-axis direction occupied by error in X-axis position of mutual capacitive touch panel according to first embodiment (%) | 3.9 | 5.27 | 4.69 | 4.02 | 4.01 |

The double-layer mutual capacitive touch panel is not limited to the above embodiment. To better compare the first embodiment and other embodiments for differences and keep the description simple, the same elements are represented by the same denotations in the other embodiments below. Further, the description focuses on the differences between the first embodiment and the other embodiments, and details of repeated parts are omitted herein.

Figure 12:
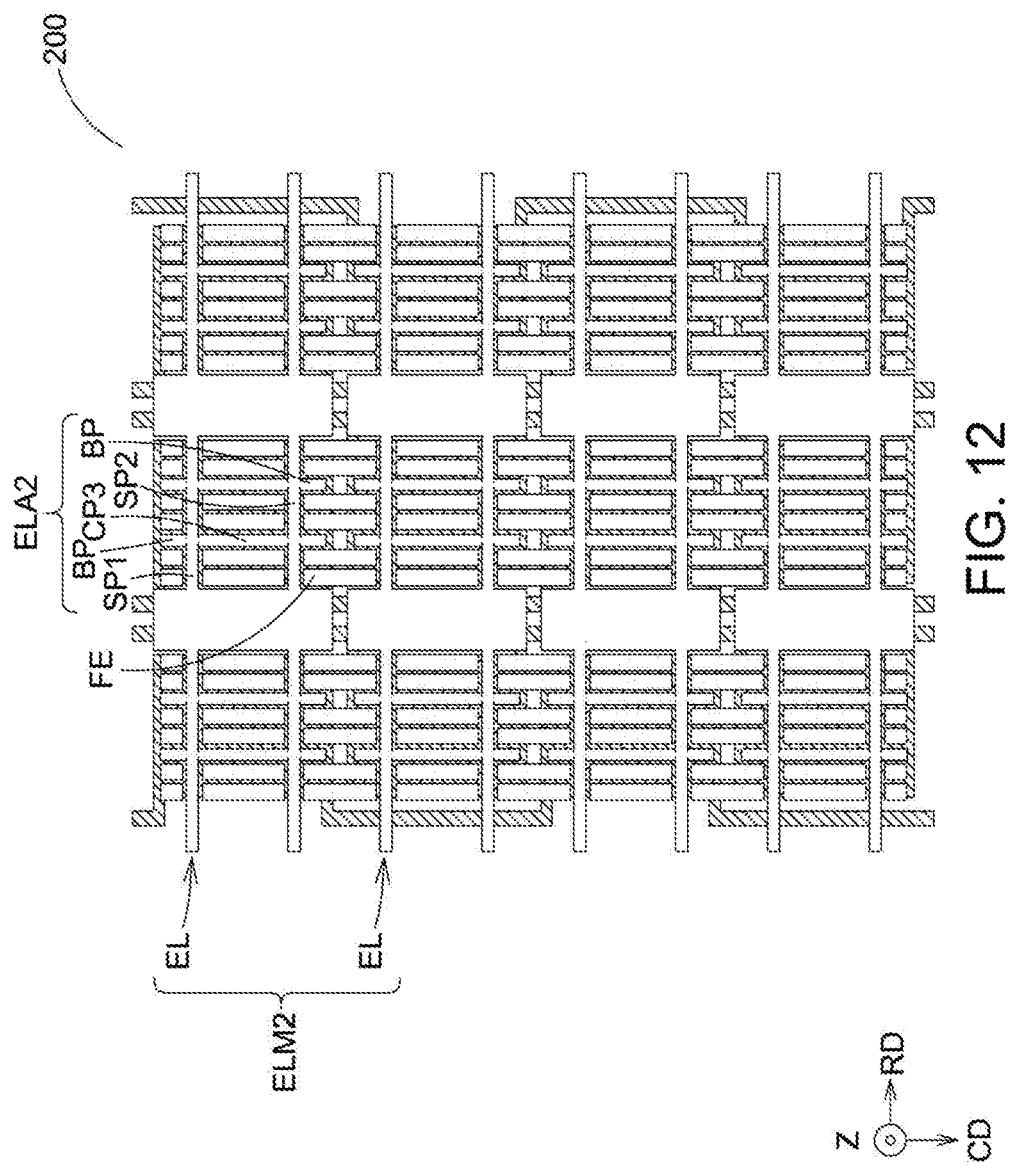
FIG. 12 is a top schematic diagram of a mutual capacitive touch panel according to a second embodiment of the present invention.

FIG. 12 shows a top schematic diagram of a mutual capacitive touch panel according to a second embodiment of the present invention. As shown in FIG. 1, compared to the first embodiment, electrode portions ELA2 in a mutual capacitive touch panel 200 provided by this embodiment are in grids. Apart from the first strip portion SP1, each of the electrode strips EL of each of the electrode strip groups ELM2 further includes a plurality of second strip portions SP2, a plurality of third connecting portions CP3 and a plurality of branch portions BP, wherein one of the first strip portions SP1, one of the second strip portions SP2, two of the third connecting portions CP3 and four of the branch portions BP form a grid electrode. For example, in addition to the first strip portion SP1, each of the electrode portions ELA2 further includes a second strip portion SP2, two third connecting portions CP3 and fourth branch portions BP. The second strip portions SP2 are parallel to the first strip portion SP1, and connect two adjacent shielding portions ELB1. Each of the third connecting portions CP3 connects between the first strip portion SP1 and the second strip portion SP2, and a part of the branch portions BP extend out from one side of the first strip portion SP1 relative to the third connecting portion CP3 while the other part of the branches BP extend out from one side of the second strip portion SP2 relative to the third connecting portion CP3, allowing the electrode portions ELA2 to appear as grids in shape. In another embodiment, the second conductive layer may not include floating electrodes.

Figure 13:
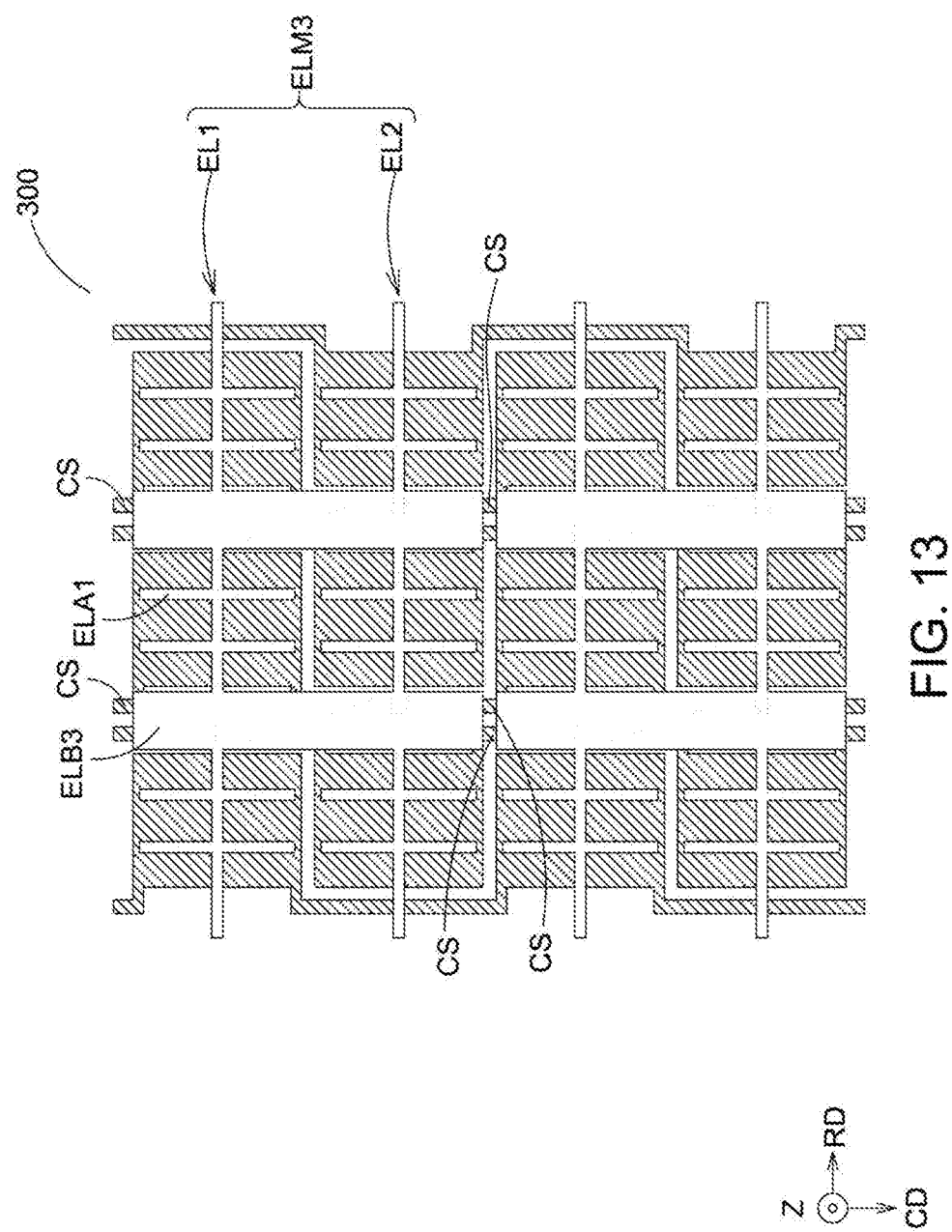
FIG. 13 is a top schematic diagram of a mutual capacitive touch panel according to a third embodiment of the present invention.

FIG. 13 shows a top schematic diagram of a mutual capacitive touch panel according to a third embodiment of the present invention. As shown in FIG. 13, compared to the first embodiment, in one of electrode strip groups ELM3 in a mutual capacitive touch panel 300 provided by this embodiment, two adjacent shielding portions located between the electrodes E of two adjacent columns are connected to one another, so as to form one single shielding portion ELB3. In other words, the same electrode strip group ELM3 in this embodiment may include a plurality of shielding portions ELB3, and each of the shielding portions ELB3 is connected to the electrode portion ELA1 of the first electrode strip EL1 and the electrode portion ELA1 of the second electrode strip EL2, allowing the shielding portions ELB3 of this embodiment to shield a larger part of the connecting segments CS. The second conductive layer of this embodiment may not include floating electrodes. In another embodiment, the second conductive layer may include floating electrodes.

Figure 14:
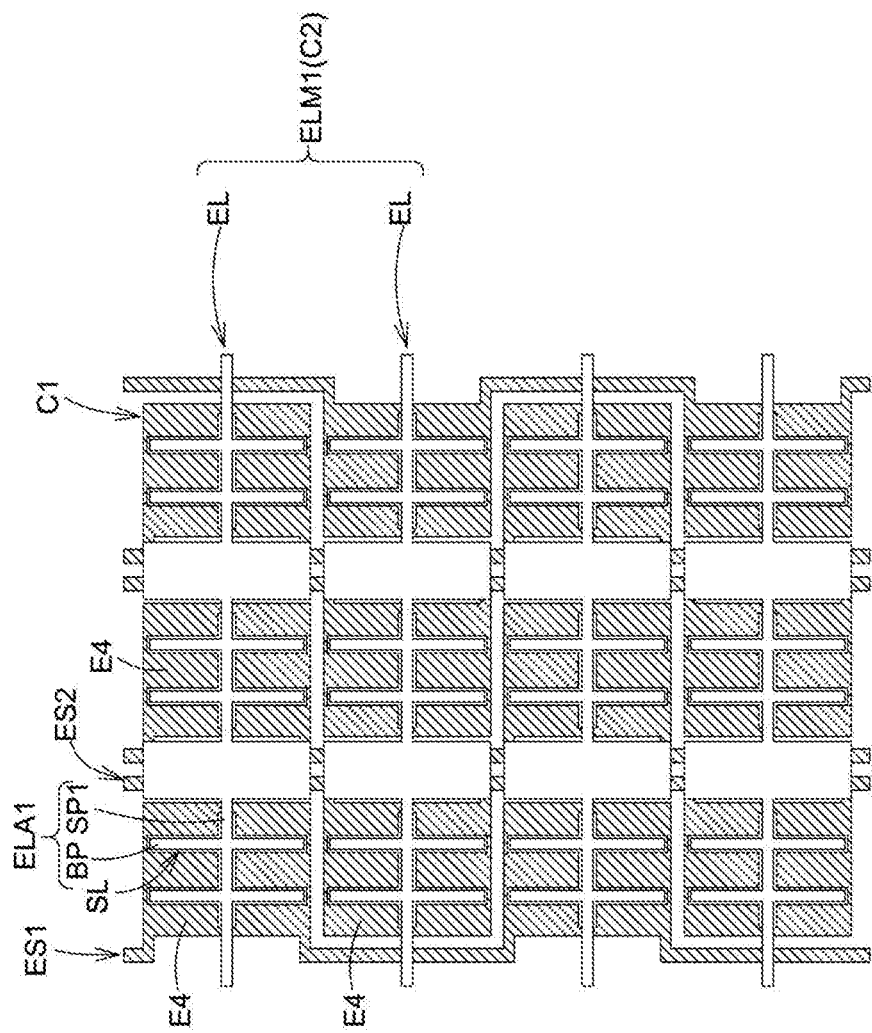
FIG. 14 is a top schematic diagram of a mutual capacitive touch panel according to a fourth embodiment of the present invention.

FIG. 14 shows a top schematic diagram of a mutual capacitive touch panel according to a fourth embodiment of the present invention. As shown in FIG. 14, compared to the first embodiment, each of the electrodes E4 in a mutual capacitive touch panel 400 provided by this embodiment may include a slit SL, which overlaps one corresponding of the first strip portions SP1. More specifically, the slits SL may at least partially overlap the electrode portions ELA1. In this embodiment, the slits SL may also appear as a grating in shape, so as to overlap the branch portions BP and the first portions SP1 of the electrode portions ELA1. Compared to the coupling capacitance between the electrodes E and the corresponding electrode portions ELA1 in the first embodiment, because the electrodes E4 are provided with the slits SL that overlap the electrode portions ELA1, the coupling capacitance between the electrodes E4 and the electrode portions ELA1 can be reduced. For example, when the first electrode series ES1 and the second electrode series ES2 are sensing electrodes and the electrode strip groups ELM1 are driving electrodes, a larger part of the electric power lines generated by the electrode strip groups ELM1 are extended onto the electrodes E4 that are not shielded by the electrode strip groups ELM1, such that changes in more electric power lines are incurred by a touch of a touching object, and the capacitance change detected by the electrodes E4 can be increased through the slits SL. Further, in the above situation, the second conductive layer C2 does not include any floating electrodes, such that the electrodes E4 of the first electrode series ES1 and the second electrode series ES2 are not shielded from sensing.

In conclusion, in the mutual capacitive touch panel of the present invention, a shielding portion overlapping a connecting line segment is provided in each of the electrode strips, and the width of the shielding portions is greater than the width of the first strip portions. Therefore, the shielding portions are capable of effectively shielding the electric power lines generated by the connecting line segments, thereby effectively enhancing the detection accuracy of the mutual capacitive touch panel.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A mutual capacitive touch panel, having a touch region and a border region, the mutual capacitive touch panel comprising:
    a first conductive layer, comprising:
        a plurality of electrodes, arranged in an array, located in the touch region; wherein, in each column of the array, the electrodes located in an $((N \times M)-1)^{th}$ row are electrically connected to one another to form a first electrode series, and the electrodes located in an $(N \times M)^{th}$ row are electrically connected to one another to form a second electrode series, where N is a positive integer greater than or equal to 2, and M is a positive integer greater than or equal to 1; and
        a plurality of connecting line segments, comprising a plurality of first connecting line segments and a plurality of second line segments, each of the first connecting line segment connecting two adjacent of the electrodes in one corresponding of the first electrode series, each of the second connecting line segments connecting two adjacent of the electrodes in one corresponding of the second electrode series;
    a second conductive layer, provided on the first conductive layer, comprising M electrode strip groups, the M electrode strip groups insulated from one another and sequentially arranged in the touch region along a column direction of the array, each of the electrode strip groups comprising N electrode strips, each of the electrode strips extending along a row direction of the array and overlapping, in a perpendicular projection direction, the electrodes of the corresponding row; wherein, each of the electrode strips comprises a plurality of first strip portions and a plurality of shielding portions, the first strip portions and the shielding portions are alternatingly connected in series along the row direction of the array, each of the first strip portion is provided correspondingly to one of the electrodes, each of the shielding portions overlaps, in the perpendicular projection direction, one corresponding of the connecting line segments, and a width of the shielding portions in the column direction of the array is greater than a width of the first strip portions in the column direction of the array; and
    an insulation layer, provided between the first conductive layer and the second conductive layer.

2. The mutual capacitive touch panel according to claim 1, further comprising a plurality of conductive lines, which are provided in the border region and electrically connect the electrode strips of the electrode strip groups, respectively.

3. The mutual capacitive touch panel according to claim 1, wherein the electrodes comprise M first electrodes and M second electrodes, the first electrodes are located in the $((N \times M)-1)^{th}$ row and the second electrodes are located in the $(N \times M)^{th}$ row, the electrode strips of each of the electrode strips comprise a first electrode strip and a second electrode strip, and one of the shielding portions of one of the first electrode strips overlaps one of the second connecting line segments.

4. The mutual capacitive touch panel according to claim 3, wherein the one of the shielding portions of the one of the first electrode strips overlaps two adjacent first connecting line segments connected to one of the first electrodes.

5. The mutual capacitive touch panel according to claim 3, wherein the one of the shielding portions of one of the second electrode strips overlaps one of the first connecting line segments.

6. The mutual capacitive touch panel according to claim 5, wherein the one of the shielding portions of one of the second electrode strips overlaps two adjacent second line segments connected to one of the second electrodes.

7. The mutual capacitive touch panel according to claim 1, wherein the width of the shielding portions in the column direction of the array is greater than or equal to 10% of a width of the electrodes in the column direction of the array.

8. The mutual capacitive touch panel according to claim 1, wherein a width of the shielding portions in the column direction of the array is greater than or equal to 50% of a width of the electrodes in the column direction of the array.

9. The mutual capacitive touch panel according to claim 1, wherein no floating electrode is present between two adjacent shielding portions between the electrodes located in two adjacent columns.

10. The mutual capacitive touch panel according to claim 1, wherein in one of the electrode strip groups, two adjacent shielding portions between the electrodes located in two adjacent columns are separated from each other.

11. The mutual capacitive touch panel according to claim 1, wherein in one of the electrode strip groups, two adjacent shielding portions between the electrodes located in two adjacent columns are connected to each other.

12. The mutual capacitive touch panel according to claim 1, wherein each of the electrode strips further comprises a plurality of branch portions extending out from two sides of each first strip portion, such that each first strip portion and a part of the branch portions form a grating electrode.

13. The mutual capacitive touch panel according to claim 1, wherein each of the electrode strips further comprises a plurality of second strip portions, a plurality of connecting portions and a plurality of branch portions, and one of the first strip portions, one of the second strip portions, two of the connecting portions and four of the branch portions form a grid electrode.

14. The mutual capacitive touch panel according to claim 1, wherein each of the electrodes comprises a slit that overlaps one corresponding of the first strip portions.

15. The mutual capacitive touch panel according to claim 1, wherein each of the first electrode series and the second electrode series is a driving electrode, and each of the electrode strip groups is a sensing electrode.

16. The mutual capacitive touch panel according to claim 1, wherein each of the first electrode series and the second electrode series is a sensing electrode, and each of the electrode strip groups is a driving electrode.

\* \* \* \* \*